United States Patent
Joung et al.

(10) Patent No.: US 7,957,260 B2
(45) Date of Patent: Jun. 7, 2011

(54) WIMAX SYSTEM ANALYZER HAVING RAS EMULATION FUNCTION AND METHOD OF ACQUIRING UL SYNCHRONIZATION AND TESTING PSS USING THE SAME

(75) Inventors: Jinsoup Joung, Seongnam-si (KR); Kyeong Min Ha, Seongnam-si (KR); Seung Hwan Ji, Seongnam-si (KR); Jun Wan Park, Seoul (KR); Cheol Jin Lee, Incheon (KR)

(73) Assignee: Innowireless Co., Ltd., Seongnam-si (KR)

( * ) Notice: Subject to any disclaimer, the term of this patent is extended or adjusted under 35 U.S.C. 154(b) by 880 days.

(21) Appl. No.: 11/936,987

(22) Filed: Nov. 8, 2007

(65) Prior Publication Data

US 2008/0117887 A1    May 22, 2008

(30) Foreign Application Priority Data

Nov. 9, 2006    (KR) .................. 10-2006-0110582

(51) Int. Cl.
 *H04J 11/00* (2006.01)
(52) U.S. Cl. .................. 370/208; 370/210; 370/252
(58) Field of Classification Search .................. 370/210, 370/252, 208
 See application file for complete search history.

(56) References Cited

U.S. PATENT DOCUMENTS

| 2006/0044108 | A1* | 3/2006 | Nowottnick | 340/5.61 |
| 2006/0276192 | A1* | 12/2006 | Dutta et al. | 455/436 |
| 2007/0041324 | A1* | 2/2007 | Shenoi | 370/235 |
| 2007/0298808 | A1* | 12/2007 | Pan et al. | 455/452.1 |
| 2008/0291841 | A1* | 11/2008 | Joung et al. | 370/252 |

* cited by examiner

*Primary Examiner* — Ricky Ngo
*Assistant Examiner* — David Oveissi
(74) *Attorney, Agent, or Firm* — Rothwell, Figg, Ernst & Manbeck, P.C.

(57) ABSTRACT

Disclosed herein are a WiMAX system analyzer having an RAS emulation function and a method of acquiring UL synchronization and testing a PSS. The WiMAX system analyzer includes a clock counter, a D/A conversion unit, an A/D conversion unit, an RF processing unit, switching means, a signal generation unit, a signal analysis unit, and control means. The clock counter creates a frame number. The D/A conversion unit converts a DL sub-frame into an analog signal. The A/D conversion unit converts a UL sub-frame signal into digital data. The RF processing unit RF-modulates the DL sub-frame, outputs the modulated DL sub-frame, and demodulating a modulated UL sub-frame. The switching means connects the RF processing unit to the D/A conversion unit or the A/D conversion unit. The signal generation unit assigns a CID, and creating a DL sub-frame. The signal analysis unit decodes the UL sub-frame, and conducts various analyses. The control means performs control so that the switching means connects to the A/D conversion unit.

8 Claims, 5 Drawing Sheets

WIMAX SYSTEM ANALYZER HAVING RAS EMULATION FUNCTION AND METHOD OF ACQUIRING UL SYNCHRONIZATION AND TESTING PSS USING THE SAME

CROSS REFERENCE TO RELATED APPLICATIONS

This application claims priority from Korean Patent Application No. 10-2006-0110582 filed Nov. 9, 2006, which is incorporated herein in its entirety.

BACKGROUND OF THE INVENTION

1. Field of the Invention

The present invention relates generally to a WiMAX system analyzer having a Radio Access Station (RAS) emulation function and a method of acquiring Uplink (UL) synchronization and testing a Portable Subscriber Station (PSS) using the WiMAX system analyzer, and, more particularly, to a WiMAX system analyzer having an RAS emulation function, which is equipped with the RAS emulation function, thereby being capable of acquiring and analyzing the UL synchronization of a PSS without requiring that a separate test function be provided to the PSS, and a method of acquiring UL synchronization and testing a PSS using the WiMAX system analyzer.

2. Description of the Related Art

Currently, methods of wirelessly accessing the Internet include a method of accessing the Internet via a mobile telephone network based on a Wireless Application Protocol (WAP) or Wireless Internet Platform for Interoperability (WIPI) platform, and a method of accessing the Internet via a public wireless Local Area Network (LAN) or an Access Point (AP). However, the method using a mobile telephone network has fundamental limitations on use as a universal Internet access method due to the limited screen size, the limited input interface, and a billing system based on a measured rate system. Meanwhile, the method using a wireless LAN has fundamental problems in that it can only be used within a range having a radius of tens of meters around an AP, and in that it also realizes poor mobility. In order to overcome such problems, 'portable Internet service' (WiMAX, or WiBro, which is a subset of mobile WiMAX and a Korean portable Internet standard) has been proposed as wireless Internet service capable of enabling high-speed Internet access at ADSL-level quality and cost, either when at rest or in intermediate-speed motion.

FIG. 1 is a diagram illustrating a method of allocating resources along a time axis and a frequency axis in Orthogonal Frequency Division Multiple Access (OFDMA). In general communication systems, since radio resources, that is, time and frequency, are limited, they must be allocated to a plurality of PSS users and used by them. Meanwhile, unlike existing CDMA-based systems and Wireless LAN (WLAN) systems, WiMAX systems employ OFDMA, in which a two-dimensional resource region, defined by the time axis and the frequency axis, is allocated to respective PSSs, as shown in FIG. 1.

FIG. 2 is a diagram showing the MAP structure of a WiMAX system. As shown in FIG. 2, in the WiMAX system, a plurality of pieces of data using the same channel coding method and modulation method is sent in a batch in order to improve efficiency. A set of data regions using the same channel coding method and modulation method is referred to as a "burst." The location and size information of each burst can be seen from the MAP information of a frame, as shown in FIG. 2. Here, the term 'frame' refers to a structured data sequence having a fixed duration, which is used in the Physical Layer (PHY) standard. A single frame may include both Downlink (hereinafter abbreviated as "DL"; a link from an RAS to a PSS) and Uplink (hereinafter abbreviated as "UL"; a link from a PSS to an RAS) sub-frames.

Since the WiMAX system employs TDD, in which UL transmission and DL transmission share the same frequency but are performed at different times, essential information, including the length of a single frame and the ratio of a DL section to a UL section, is provided via MAP information. In order to dynamically allocate resources to PSSs, an RAS may send different MAPs through each frame. In this case, a MAP may be divided into DL_MAP, containing DL transmission information, and UL_MAP, containing UL resource access authority. Here, DL_MAP can be defined as a Media Access Control (MAC) layer message that defines the symbol offset and sub-channel offset of a burst divided and multiplexed along the subchannel and time axes on a downlink by an RAS, and the numbers of symbols and sub-channels, that is, allocated resources. A frame number having a value varying depending on the frame is included in the DL_MAP. Next, the UL_MAP may be defined as a set of pieces of information that completely defines the access to a UL section. UL_MAP may include Connection Identifier (CID) information. Furthermore, a uniquely defined preamble is present in the first symbol of a DL sub-frame, by which the PSS can be made aware of the start point of DL transmission. Furthermore, a cell Identification (ID) information and segment information are included in the preamble.

Meanwhile, if the frame number of a DL signal does not increase, the PSS loses synchronization, so that a DL sub-frame having an increasing frame number needs to be provided in order for the WiMAX system analyzer to analyze the performance of the PSS. As a result, in order to acquire and analyze UL synchronization via the WiMAX system analyzer, the help of the RAS is inevitably required. However, there are problems in that it is not easy in practice to use the RAS to test the PSS and in that the cost of establishing an analysis environment for the test is high.

Of course, if the PSS is equipped with a predetermined test mode (PHY mode), for example, a function of creating a UL sub-frame without requiring a network entry process in conjunction with the RAS when a CID, previously assigned thereto and stored therein, is received, a function of not performing error processing even though the frame number of a DL sub-frame does not increase, or a function of generating a trigger signal, indicating the start of a UL sub-frame when outputting the UL sub-frame, the help of the RAS is not required. However, there is a problem in that analysis itself is impossible if a PSS manufacturer does not provide the test mode, and there is inconvenience in that different interfaces must be managed for respective manufacturers when the respective PSS manufacturers provide the different interfaces, even if the PSS manufacturers provide such test modes.

SUMMARY OF THE INVENTION

Accordingly, the present invention has been made keeping in mind the above problems occurring in the prior art, and an object of the present invention is to provide a WiMAX system analyzer having an RAS emulation function, which is equipped with the RAS emulation function, and is thus capable of acquiring and analyzing the UL synchronization of a PSS without requiring that a separate test function is provided to the PSS or requiring the help of the RAS, and a method of acquiring UL synchronization and testing the PSS using the WiMAX system analyzer.

In order to accomplish the above object, the present invention provides a WiMAX system analyzer having an RAS, including a clock counter for creating a frame number by sequentially increasing a number by one at intervals, each interval corresponding to a length of a frame of a WiMAX Internet; a Digital to Analog (D/A) conversion unit for converting a DL sub-frame into an analog signal; an Analog to Digital (A/D) conversion unit for converting a UL sub-frame signal into digital data; a Radio Frequency (RF) processing unit for RF-modulating the D/A-converted DL sub-frame, outputting the modulated DL sub-frame to a PSS, and demodulating a modulated UL sub-frame received from the PSS; switching means for selectively connecting the RF processing unit to the D/A conversion unit or the A/D conversion unit; a signal generation unit for assigning a CID to the PSS by performing a previously defined network entry process in conjunction with the PSS, and creating a DL sub-frame by encoding DL data having the frame number, generated by the clock counter, and the CID information; a signal analysis unit for decoding the UL sub-frame obtained through the conversion of the A/D conversion unit, and conducting various analyses on the UL sub-frame; and control means for controlling overall operation of the WiMAX system analyzer and performing control so that the switching means connects to the A/D conversion unit when a predetermined time period has elapsed after the switching means is connected to the D/A conversion unit.

In the above construction, the clock counter, the signal generation unit and the signal analysis unit are implemented using Field Programmable Gate Arrays (FPGAs). The signal generation unit and the signal analysis unit are implemented using Digital Signal Processor (DSP) boards.

Meanwhile, the signal generation unit creates a DL sub-frame by performing channel coding and modulation, construction of a logic frame, a scrambling process of encoding a signal using parameters of each cell so as to make it possible to identify each cell and frame, Inverse Fast Fourier Transform (IFFT) and Low Pass Filtering (LPF) on the data received from the control unit, and the signal analysis unit analyzes the UL sub-frame by performing LPF, Fast Fourier Transform (FFT), descrambling with lower 4-bit information of a frame number, channel compensation, construction of a logic frame, demodulation and channel decoding on the UL sub-frame.

Additionally, the present invention provides a method for acquiring UL synchronization and testing a PSS using a WiMAX system analyzer having an RAS emulation function, including step (a) of assigning a CID by performing a network entry process in conjunction with a PSS and establishing a provisioned connection according to a procedure defined in a corresponding specification; step (b) for creating a sequentially increasing frame number at intervals each corresponding to a length of a frame of a WiMAX signal; step (c) for D/A-converting, RF-modulating and outputting a DL sub-frame, obtained by continuously encoding DL data, including the CID information and the created frame number, in real time; step (d) of receiving a UL sub-frame, which is created by encoding known data based on a corresponding specification using the frame number from a time point after step (c), RF-modulated, and output by the PSS; and step (e) for A/D-converting and decoding the UL sub-frame, and performing various analyses on the UL sub-frame.

In the above construction, step (a) includes step (a1) of sending a DL sub-frame, including a cell ID and segment information, so that the PSS can establish DL channel synchronization by scanning a DL channel, extract the cell ID and the segment information from a preamble of the established DL sub-frame, and store the cell ID and the segment information; step (a2) of broadcasting a DL-MAP including frame number, a Downlink Channel Descriptor (DCD) and an Uplink Channel Descriptor (UCD) so that the PSS can receive the DL-MAP, the DCD and the UCD; step (a3) of performing ranging and a various parameter correction process in conjunction with the PSS, and assigning CID information to be used by the PSS; step (a4) of performing basic capability negotiation in conjunction with the PSS; and step (a5) of establishing a provisioned connection by performing remaining processes defined in the specification.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
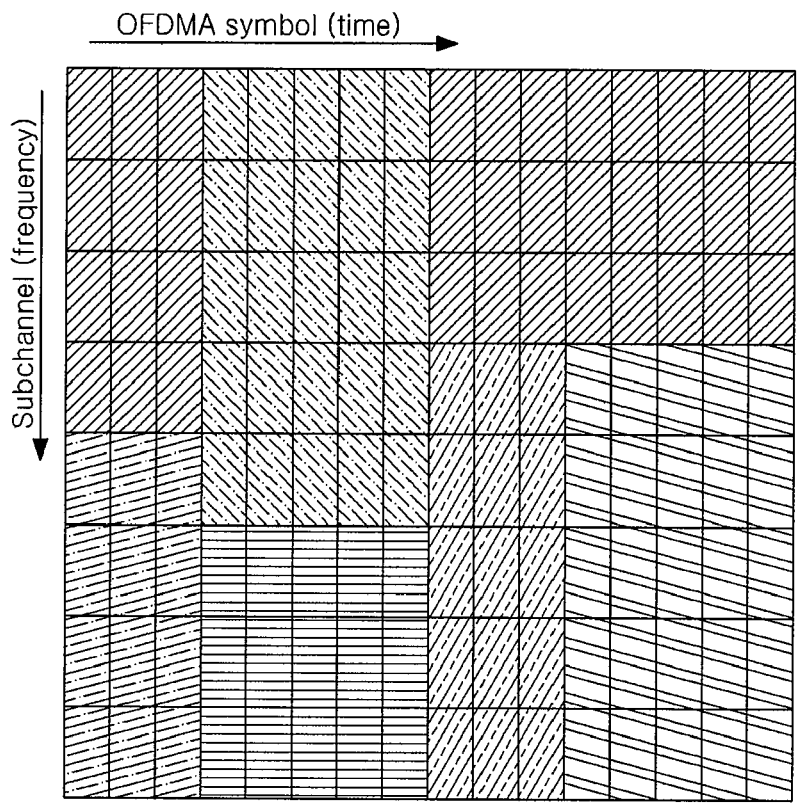
FIG. 1 is a diagram illustrating a method of allocating resources along a time axis and a frequency axis in OFDMA.
Figure 2:
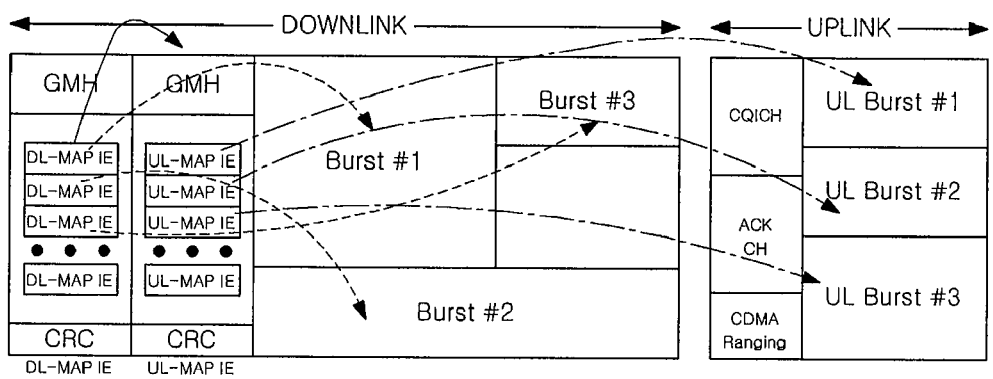
FIG. 2 is a diagram showing the MAP structure of a WiMAX system.

Reference now should be made to the drawings, in which the same reference numerals are used throughout the different drawings to designate the same or similar components.

Preferred embodiments of a WiMAX system analyzer having an RAS emulation function and a method of acquiring UL synchronization and testing a PSS according to the present invention will be described in detail with reference to the accompanying drawings below.

Figure 3:
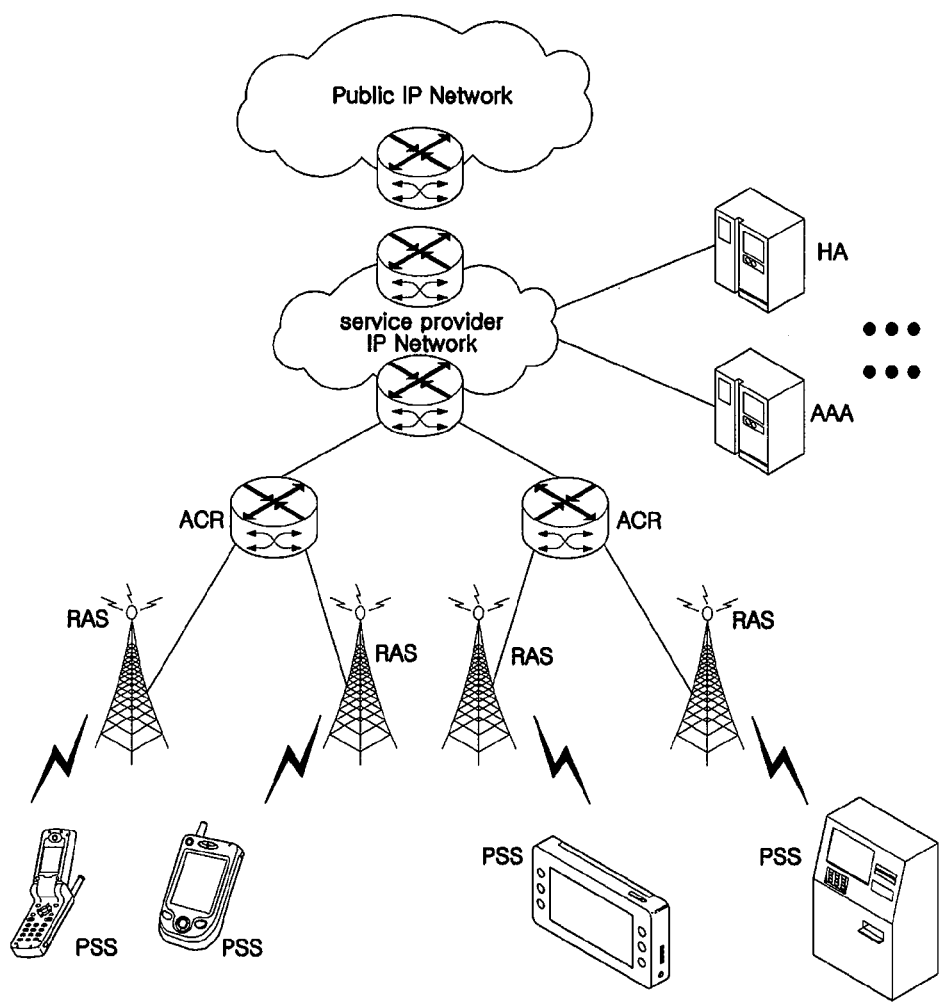
FIG. 3 is a diagram showing the network configuration of a typical WiMAX system.

FIG. 3 is a diagram showing the network configuration of a typical WiMAX system. As shown in FIG. 3, the basic network configuration of the WiMAX system includes Portable Subscriber Stations (PSSs), Radio Access Stations (RASs), and Access Control Routers (ACRs). In the above-described configuration, the PSSs perform the functions of WiMAX service access, IP-based service access, IP mobility, PSS/user authentication and security, the reception of multicast service, and interworking with other networks. Meanwhile, the RASs perform the functions of WiMAX service access, wireless resource management and control, support for mobility handoff, authentication and security, the provision of QoS, downlink multicast, billing, the creation of statistical information, and the provision of notification. Finally, the ACRs perform the functions of IP routing, mobility management, authentication and security, QoS provision, IP multicasting, the provision of billing service provision to a billing server, mobility control between the RASs under each of the ACRs, and resource management and control.

The following Table 1 shows principal parameters and essential requirements in the WiMAX system. As shown in Table 1, it can be seen that the WiMAX system, which is the object of analysis of the present invention, employs Time Division Duplexing (TDD) as a duplex operation method and OFDMA as a multiple access method.

TABLE 1

| Item | Method or value |
| --- | --- |
| duplex operation method | TDD |
| multiple access method | OFDMA |
| system bandwidth | 8.75 MHz |
| Transmission rate per subscriber | uplink minimum/maximum 128 Kbps/1 Mbps<br>downlink minimum/maximum 512 Kbps/3 Mbps |
| frequency reuse coefficient | 1 |
| frequency efficiency | maximum frequency efficiency: downlink/uplink (6/2)<br>average frequency efficiency: downlink/uplink (2/1) |
| handoff | inter-cell handoff within RAS,<br>inter-RAS handoff,<br>inter-frequency handoff: 150 ms |
| mobility | maximum of 60 km/h |
| service coverage | pico-cell: 100 m<br>micro-cell: 400 m<br>macro-cell: 1 km |

The following Table 2 shows the basic parameters of OFDMA for a Partial Usage of Sub-Channel (PUSC) diversity sub-channel, which is designated as an essential implementation option in the WiMAX system.

TABLE 2

| Parameter | Parameter value | |
| --- | --- | --- |
| system bandwidth | 8.75 | MHz |
| sampling frequency ($F_s$) | 10 | MHz |
| sampling interval ($1/F_s$) | 100 | ns |
| FFT size ($N_{FTT}$) | 1024 | |
| number of subcarriers used | 840 | |
| number of data subcarriers | 720 | |
| number of pilot subcarriers | 120 | |
| subcarrier frequency interval | 9.765625 | MHz |
| effective symbol time ($T_b = 1/\Delta f$) | 102.4 | μs |
| CP time ($T_g = T_b/8$) | 12.8 | μs |
| OFDMA symbol time ($T_s = T_b + T_g$) | 115.2 | μs |
| TDD frame length | 5 | ms |

As shown in Table 2, it can be seen that, in the WiMAX, the length of a single TDD frame is 5 ms and symbol time is 115.2 μs.

Figure 4:
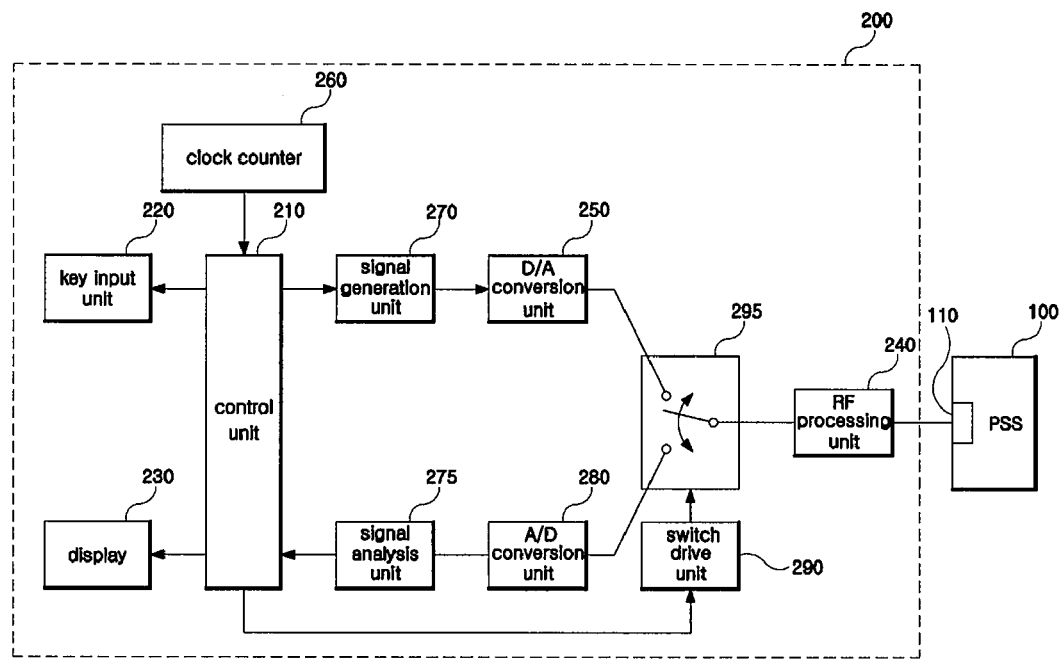
FIG. 4 is a block diagram showing a WiMAX system analyzer having an RAS emulation function according to an embodiment of the present invention.

FIG. 4 is a block diagram showing a WiMAX system analyzer 200 having an RAS emulation function according to an embodiment of the present invention. The WiMAX system analyzer 200 according to an embodiment of the present invention emulates some functions of an RAS, thus performing the functions of, in conjunction with a PSS 100, downloading MAC messages, such as UCD/DCD messages (which will be described later), at predetermined time intervals and modulating and encoding various messages necessary for communication with the PSS 100 in real time at predetermined time points, according to necessity, or in response to the occurrence of related events, like an actual RAS, and, additionally, receives a UL sub-frame from the PSS 100 and performs necessary analyses on the UL sub-frame. The WiMAX system analyzer 200 of the present invention may be connected to the RF input/output terminal 110 of the PSS 100 via a wired cable.

In greater detail, the WiMAX system analyzer 200 of the present invention, as shown in FIG. 4, may include a control unit 210 for controlling the overall operation of the analyzer, a key input unit 220 for receiving various set and input details necessary for the measurement of the performance of the PSS from a user, a display 230 for visually notifying the user of the operating status of the analyzer and the results of the analysis of performance, a clock counter 260 for creating a frame number by sequentially increasing a number by one at predetermined intervals corresponding to the lengths of a frame, for example, time intervals of 5 ms, a signal generation unit 270 for establishing a connection prescribed in the standard by performing an initialization process in conjunction with the PSS 100 under the control of the control unit 210 and creating a DL sub-frame by encoding predetermined raw data using the frame number, created by the clock counter 260, a cell ID, assigned to the PSS 100, and the CID information in the state in which the connection is established, a D/A conversion unit 250 for converting various digital data, generated by the signal generation unit 270, into corresponding analog signals, an RF processing unit 240 for modulating and outputting the analog signal, obtained through the conversion of the D/A conversion unit 250, and RF-demodulating various signals RF modulated by and received from the PSS 100, an A/D conversion unit 280 converting the analog signal, demodulated by the RF processing unit 240, into corresponding digital data, a signal analysis unit 275 for decoding and analyzing the digital data obtained through the conversion of the A/D conversion unit 280, a switch 295 for selectively connecting the RF processing unit 240 to the D/A conversion unit 250 or the A/D conversion unit 280, and a switch drive unit 290 for driving the switch 295 under the control of the control unit 210.

In the above construction, each of the signal generation unit 270, the signal analysis unit 275 and the clock counter 260 may be implemented using a Field Programmable Gate Array (FPGA) or a Digital Signal Processor (DSP) board. The signal generation unit 270 creates data, such as a DL sub-frame, through the channel coding and modulation of data, including a MAC message, received from the control unit 210, the construction of a logic frame, a scrambling process of encoding a signal using the parameters (cell ID information) of each cell so as to make it possible to identify each cell and frame, Inverse Fast Fourier Transform (IFFT), and Low Pass Filtering (LPF). The signal analysis unit 275 performs the operation opposite to that of the signal generation unit 270, that is, LPF and Fast Fourier Transform (FFT), descrambling lower 4-bit information of a frame number, channel compensation, the construction of a logic frame, demodulation, channel decoding, and the acquisition and analysis of a MAC message. The control unit 210 may be implemented using a microcomputer equipped with its own memory, the display 230 may be implemented using a flat panel display, such as a Cathode Ray Tube (CRT) or a Liquid Crystal Display (LCD), and the switch 295 may be implemented using a non-contact semiconductor switch.

Meanwhile, since, in the present invention, the single control unit 210 controls both the signal generation unit 270 and the signal analysis unit 275, and also detects the frame number currently generated by the clock counter 260, the synchronization of a UL sub-frame can be accurately calculated and extracted.

Figure 5:
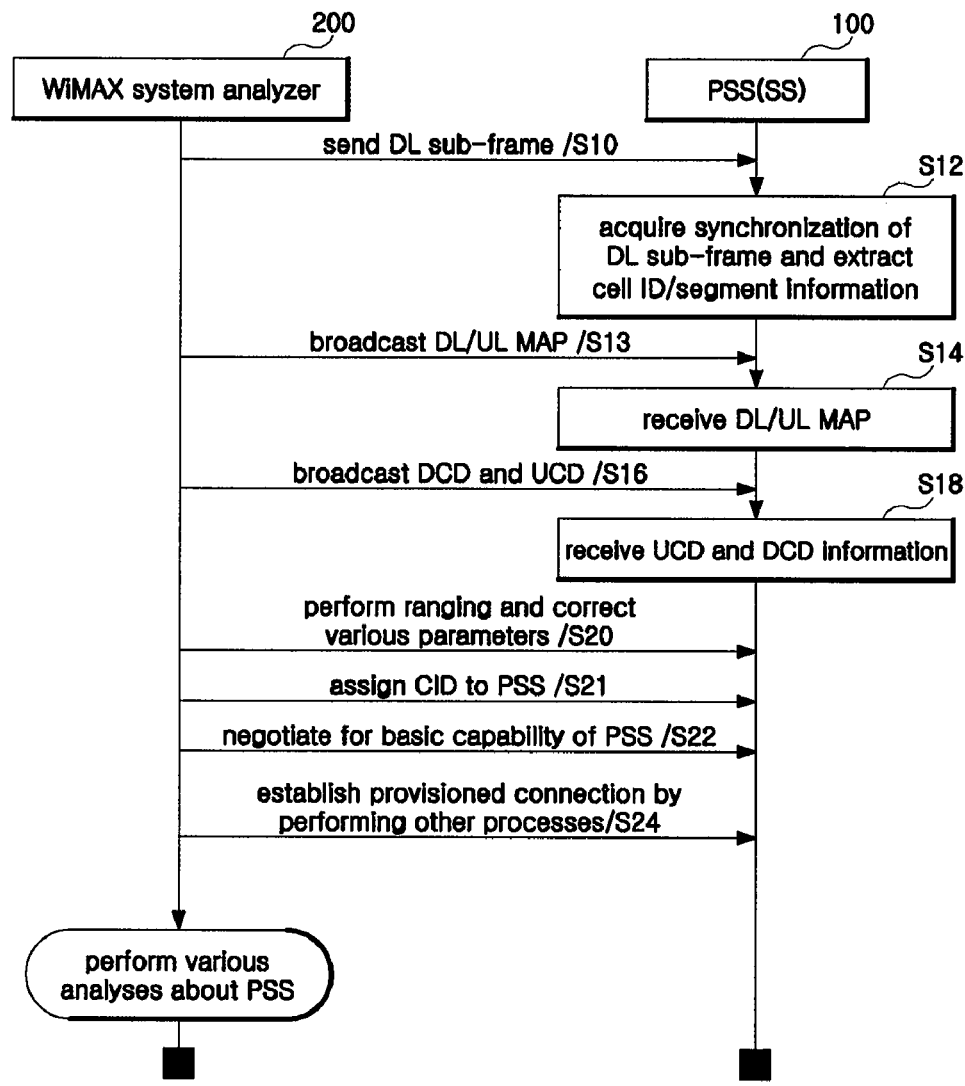
FIG. 5 is a flowchart illustrating a network entry process in the WiMAX system analyzer of the present invention shown in FIG. 4.

FIG. 5 is a flowchart illustrating a network entry process in the WiMAX system analyzer of the present invention, shown in FIG. 4. Generally, systems, including an RAS, must support a process that can be used when a new PSS or a new node registers with a communication network. After a PSS has been turned on, a network entry process is carried out to perform the maintenance of the quality of communication with an RAS, the correction of the start point of a UL section, the allocation of a CID by the RAS for communication, and consultation for a support profile. Accordingly, the WiMAX system analyzer of the present invention emulates a function of performing such a network entry process. In greater detail, first, at step S10, the WiMAX system analyzer sends a DL sub-frame, in which a preamble is included in a first symbol, to the PSS 100. Accordingly, at step S12, the PSS 100 establishes DL channel synchronization (DL Synch) by scanning a DL channel, extracts a cell ID and segment information from the preamble of the established DL sub-frame, and then stores the cell ID and the segment information.

In this state, the WiMAX system analyzer 200 broadcasts a DL MAP and a UL MAP, including a physical layer channel synchronization field (PHY Synch), an operation ID, a sector ID and MAP message length information, so as to process the network entry process at step S13, and then the PSS 100 receives the broadcast DL MAP and UL MAP at step S14. Thereafter, the WiMAX system analyzer 200 broadcasts a Downlink Channel Descriptor (DCD), that is, a MAC message describing physical layer characteristics in a DL, and an Uplink Channel Descriptor (UCD), that is, a MAC message describing physical layer characteristics in a UL, by performing step S16 again, and the PSS 100 receives the DCD and UCD information and prepares for code ranging at step S18.

Thereafter, at step S20, a ranging and parameter adjustment process is carried out between the WiMAX system analyzer 200 and the PSS 100. In greater detail, the PSS 100 sends a ranging request message to the WiMAX system analyzer 200, receives a ranging response message, including information such as a UL timing adjustment value, a power level adjustment value and a frequency offset adjustment value, from the WiMAX system analyzer 200 in response to the ranging request message, and performs ranging and parameter adjustment. At the same time, the WiMAX system analyzer 200 assigns a basic CID to the PSS 100 at step S21, and the PSS 100 stores the basic CID. Here, the ranging process is carried out to perform the acquisition of UL synchronization and the control of power between the RAS and the PSS. The types of ranging include initial ranging, periodic ranging, handoff ranging, and CDMA bandwidth request ranging. The initial ranging is performed by a PSS that desires to perform UL synchronization with a system channel. The periodic ranging is periodically performed to track synchronization. The handoff ranging is performed by a PSS that desires to perform synchronization with another RAS during a handoff process. CDMA bandwidth request ranging is performed when a PSS requests bandwidth from an RAS. Meanwhile, a CID is an identifier indicating a unidirectional mapping connection between the MAC entities of the RAS and the PSS, and is a 16-bit value identifying a single UL/DL pair for a single connection between the same entities in the MAC layers of a RAS and a PSS. As described above, in the present invention, a CID is assigned through a network entry process. The reason for this is that the PSS 100 is placed under the control of the WiMAX system analyzer 200, and thus various tests on the PSS 100 can be automatically conducted. In this case, when the CID is inserted into the UL MAP of a DL sub-frame, the PSS 100 responds faithfully in accordance with the specifications of the WiMAX system. Accordingly, when UL space is opened using a CID assigned to each frame UL MAP, the PSS 100 must send each piece of frame UL data, and the WiMAX system analyzer 200 can analyze data and provide the results of the analysis. Even in the case where various test items vary, successive signals can be sent at intervals of 5 ms without releasing a connection between the WiMAX system analyzer 200 and the PSS 100, so that the test time can be reduced.

Referring back to FIG. 4, after this ranging process has been completed, a basic capability negotiation process for the PSS 100 is carried out between the WiMAX system analyzer 200 and the PSS 100 through step S22. In greater detail, immediately after ranging has been completed, the PSS 100 notifies the WiMAX system analyzer 200 of its own basic capability by sending information about its basic capability, set to an 'On' state, via a Subscriber Station Basic Capability-Request (SBC-REQ) message, and the WiMAX system analyzer 200 sends capability common to it and the PSS 100 via an SBC Response (SBC-RSP) message in response to the SBC-REQ message.

Thereafter, at step S24, a provisioned connection is established by performing other processes, defined in the specifications, between the WiMAX system analyzer 200 and the PSS 100. In greater detail, after PSS authorization & key exchange, PSS registration, IP version negotiation, the establishment of IP connectivity, the setting of time of day, the transfer of operational parameters, and the establishment of a provisioned connection have been performed, various analyses are performed on the PSS 100, as shown in FIG. 6.

Figure 6:
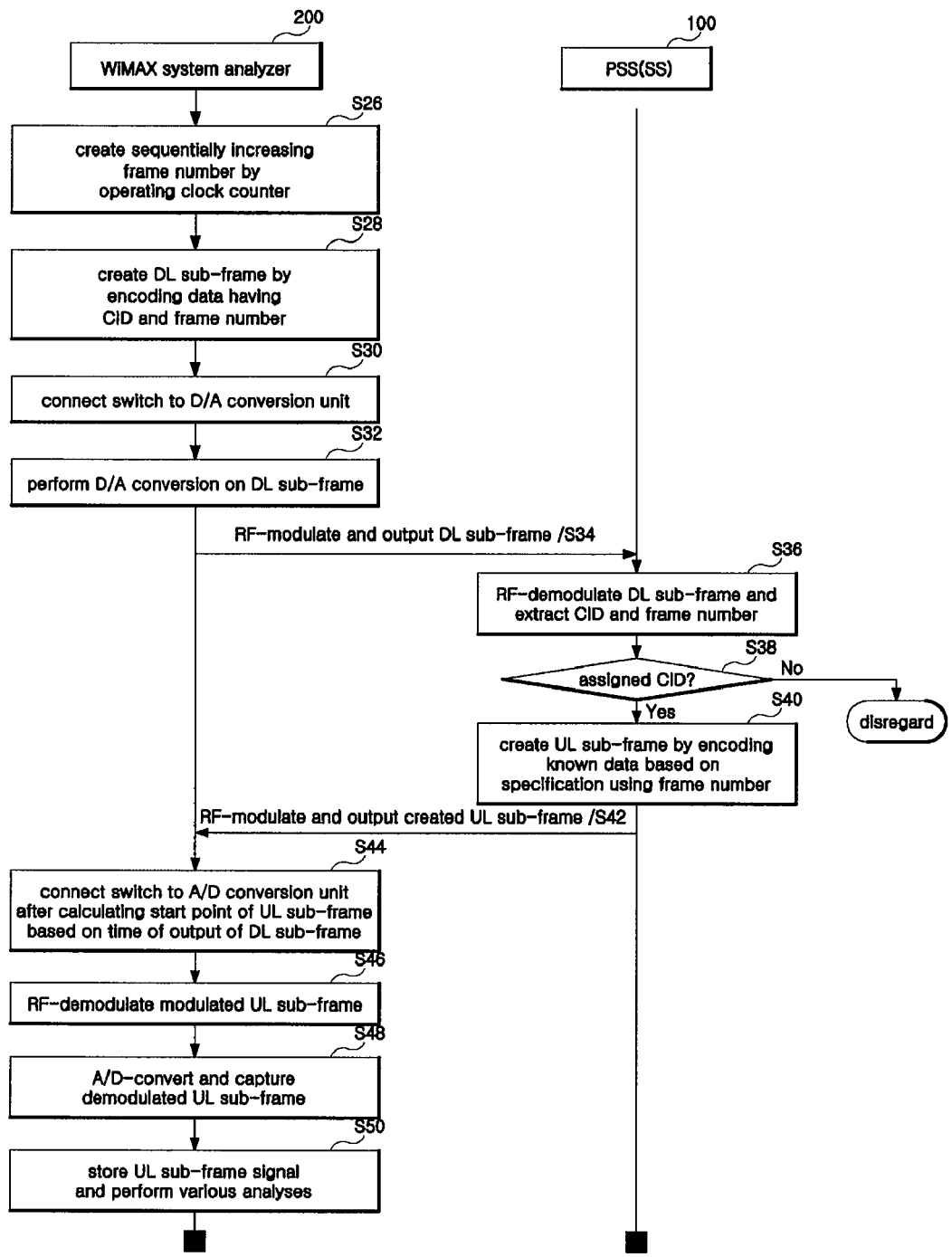
FIG. 6 is a flowchart illustrating a process of performing various analyses on a PSS in the WiMAX system analyzer of the present invention shown in FIG. 4.

FIG. 6 is a flowchart illustrating a process of performing various analyses on a PSS in the WiMAX system analyzer of the present invention shown in FIG. 4. After the provisioned connection has been established through the process of FIG. 5, the WiMAX system analyzer 200 creates a sequentially increasing frame number by operating the clock counter 260 at step S26 of FIG. 6, and creates a DL sub-frame, including a DL MAP and CID information, by encoding data, including the information about the CID previously assigned to the PSS 100 and the created frame number, at step S28. Thereafter, the WiMAX system analyzer 200 connects the switch 295 to the D/A conversion unit 250 and converts the DL sub-frame into an analog signal at steps S30 and S32, and RF-modulates the resulting analog signal and outputs a modulated signal to the PSS 100 at step S34.

Meanwhile, at step S36, the PSS 100 performs RF modulation and A/D conversion on the modulated DL sub-frame signal received from the WiMAX system analyzer 200, and then extracts the CID information from the UL MAP and the frame number from the DL MAP. Thereafter, the PSS 100 determines whether the extracted CID information is identical with the previously assigned and stored CID information at step S38. The PSS 100 disregards the DL sub-frame if they are not identical with each other, and creates a UL sub-frame by encoding known data for the specification using a frame number at step S40 if they are identical with each other. Thereafter, the PSS 100 performs D/A conversion and RF modulation on the created UL sub-frame at step S42, and outputs a resulting frame to the WiMAX system analyzer 200.

Meanwhile, at step S44, the WiMAX system analyzer 200 calculates the start point of the UL sub-frame based on the time at which the DL sub-frame is output, that is, the time at which the switch 295 is connected to the D/A conversion unit 250 (for example, the time 3.1 ms after the time at which the DL sub-frame is output), and connects the switch 295 to the A/D conversion unit 280. Thereafter, the modulated UL sub-frame signal, output from the PSS 100, is demodulated through the RF processing unit 240 at step S46, the demodulated UL sub-frame is converted into digital data through the A/D conversion unit 280 at step S48, and the digital UL sub-frame is decoded through the signal analysis unit 275 and is then subjected to necessary various analyses, for example, analyses of Error Vector Magnitude (EVM) or frequency offset, the transmission power of the PSS, spectrum flatness, spectral mask, and spurious emission at step S50, thereby detecting the physical layer performance of the PSS 100. Meanwhile, steps S26 to S50 are repeated until the test procedure is completed.

According to the WiMAX system analyzer having a RAS emulation function and the method of acquiring UL synchronization and testing a PSS using the WiMAX system analyzer, the RAS emulation function is provided to the WiMAX system analyzer, so the WiMAX service provider can acquire and analyze the UL synchronization of the PSS without the provision of a separate test function to the PSS or the help of the RAS, thus being capable of performing tests of the quality of the PSS at low cost regardless of the performance of the PSS.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A WiMAX system analyzer having a Radio Access Station (RAS), comprising:
   a clock counter for creating a frame number by sequentially increasing a number by one at intervals, each interval corresponding to a length of a frame of a WiMAX;
   a Digital to Analog (D/A) conversion unit for converting a DL sub-frame into an analog signal;
   an Analog to Digital (A/D) conversion unit for converting a UL sub-frame signal into digital data;
   a Radio Frequency (RF) processing unit for RF-modulating the D/A-converted DL sub-frame, outputting the modulated DL sub-frame to a Portable Subscriber Station (PSS), and demodulating a modulated Uplink (UL) sub-frame received from the PSS;
   switching means for selectively connecting the RF processing unit to the D/A conversion unit or the A/D conversion unit;
   a signal generation unit for assigning a Connection Identifier (CID) to the PSS by performing a previously defined network entry process in conjunction with the PSS, and creating a DL sub-frame by encoding DL data having the frame number, generated by the clock counter, and the CID information;
   a signal analysis unit for decoding the UL sub-frame obtained through the conversion of the A/D conversion unit, and conducting various analyses on the UL sub-frame; and
   control means for controlling overall operation of the WiMAX system analyzer and performing control so that the switching means connects to the A/D conversion unit when a predetermined time period has elapsed after the switching means is connected to the D/A conversion unit.

2. The WiMAX system analyzer as set forth in claim 1, wherein the clock counter, the signal generation unit and the signal analysis unit are implemented using Field Programmable Gate Arrays (FPGAs).

3. The WiMAX system analyzer as set forth in claim 1, wherein the signal generation unit and the signal analysis unit are implemented using Digital Signal Processor (DSP) boards.

4. The WiMAX system analyzer as set forth in claim 1, wherein:
   the signal generation unit creates a DL sub-frame by performing channel coding and modulation, construction of a logic frame, a scrambling process of encoding a signal using parameters of each cell so as to make it possible to identify each cell and frame, Inverse Fast Fourier Transform (IFFT) and Low Pass Filtering (LPF) on the data received from the control unit; and
   the signal analysis unit analyzes the UL sub-frame by performing LPF, Fast Fourier Transform (FFT), descrambling with lower 4-bit information of a frame number, channel compensation, construction of a logic frame, demodulation and channel decoding on the UL sub-frame.

5. A method for acquiring UL synchronization and testing a PSS using a WiMAX system analyzer having an RAS emulation function, comprising:
   step (a) of assigning a CID by performing a network entry process in conjunction with a PSS and establishing a provisioned connection according to a procedure defined in a corresponding specification;
   step (b) for creating a sequentially increasing frame number at intervals each corresponding to a length of a frame of a WiMAX signal;
   step (c) for D/A-converting, RF-modulating and outputting a DL sub-frame, obtained by continuously encoding DL data, including the CID information and the created frame number, in real time;
   step (d) of receiving a UL sub-frame, which is created by encoding known data based on a corresponding specification using the frame number from a time point after step (c), RF-modulated, and output by the PSS; and
   step (e) for ND-converting and decoding the UL sub-frame, and performing various analyses on the UL sub-frame.

6. The method as set forth in claim 5, wherein step (a) comprises:
   step (a1) of sending a DL sub-frame, including a cell ID and segment information, so that the PSS can establish DL channel synchronization by scanning a DL channel, extract the cell ID and the segment information from a preamble of the established DL sub-frame, and store the cell ID and the segment information;
   step (a2) of broadcasting a DL-MAP including frame number, a Downlink Channel Descriptor (DCD) and an Uplink Channel Descriptor (UCD) so that the PSS can receive the DL-MAP, the DCD and the UCD;
   step (a3) of performing ranging and a various parameter correction process in conjunction with the PSS, and assigning CID information to be used by the PSS;
   step (a4) of performing basic capability negotiation in conjunction with the PSS; and
   step (a5) of establishing a provisioned connection by performing remaining processes defined in the specification.

7. The WiMAX system analyzer as set forth in claim 2, wherein:
   the signal generation unit creates a DL sub-frame by performing channel coding and modulation, construction of a logic frame, a scrambling process of encoding a signal using parameters of each cell so as to make it possible to identify each cell and frame, Inverse Fast Fourier Transform (IFFT) and Low Pass Filtering (LPF) on the data received from the control unit; and
   the signal analysis unit analyzes the UL sub-frame by performing LPF, Fast Fourier Transform (FFT), descrambling with lower 4-bit information of a frame number, channel compensation, construction of a logic frame, demodulation and channel decoding on the UL sub-frame.

8. The WiMAX system analyzer as set forth in claim 3, wherein:
 the signal generation unit creates a DL sub-frame by performing channel coding and modulation, construction of a logic frame, a scrambling process of encoding a signal using parameters of each cell so as to make it possible to identify each cell and frame, Inverse Fast Fourier Transform (IFFT) and Low Pass Filtering (LPF) on the data received from the control unit; and the signal analysis unit analyzes the UL sub-frame by performing LPF, Fast Fourier Transform (FFT), descrambling with lower 4-bit information of a frame number, channel compensation, construction of a logic frame, demodulation and channel decoding on the UL sub-frame.

* * * * *